United States Patent
Villeminey

(10) Patent No.: US 7,290,822 B2
(45) Date of Patent: Nov. 6, 2007

(54) OCCUPANT SEAT SYSTEM

(75) Inventor: Jean-Paul Villeminey, Milford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 36 days.

(21) Appl. No.: 11/213,402

(22) Filed: Aug. 26, 2005

(65) Prior Publication Data

US 2007/0046061 A1   Mar. 1, 2007

(51) Int. Cl.
*B60N 2/02* (2006.01)

(52) U.S. Cl. .............................. 296/65.09; 296/65.05; 296/66

(58) Field of Classification Search ............ 296/65.09, 296/65.05, 66; 297/325, 341
See application file for complete search history.

(56) References Cited

U.S. PATENT DOCUMENTS

| | | | | |
|---|---|---|---|---|
| 3,311,405 A * | 3/1967 | Brennan et al. | ............... | 296/66 |
| 4,699,418 A * | 10/1987 | Plavetich | .................. | 296/65.09 |
| 4,805,953 A * | 2/1989 | Yamauchi | ................ | 296/65.09 |
| 5,383,699 A * | 1/1995 | Woziekonski et al. | ... | 296/65.09 |
| 5,482,349 A * | 1/1996 | Richter et al. | ........... | 296/65.09 |
| 5,542,745 A * | 8/1996 | Takeda et al. | ......... | 297/378.12 |
| 5,570,931 A * | 11/1996 | Kargilis et al. | .......... | 296/65.09 |
| 5,868,451 A * | 2/1999 | Uno et al. | ................ | 296/65.05 |
| 6,000,742 A * | 12/1999 | Schaefer et al. | ......... | 296/65.09 |
| 6,123,380 A * | 9/2000 | Sturt et al. | ................ | 296/65.09 |
| 6,293,603 B1 * | 9/2001 | Waku et al. | ............. | 296/65.09 |
| 6,435,589 B2 * | 8/2002 | Shimizu et al. | .......... | 296/65.09 |
| 6,644,730 B2 * | 11/2003 | Sugiura et al. | .......... | 296/65.09 |
| 6,648,392 B2 * | 11/2003 | Fourrey et al. | .......... | 296/65.09 |
| 6,746,083 B2 * | 6/2004 | Drew et al. | ............... | 296/65.09 |
| 6,827,394 B2 * | 12/2004 | Watanabe et al. | ......... | 206/65.01 |
| 6,869,138 B2 * | 3/2005 | Rhodes et al. | ........... | 296/65.09 |
| 6,997,498 B2 * | 2/2006 | Oyama | .................... | 296/65.05 |
| 7,029,063 B2 * | 4/2006 | Holdampf | ................ | 296/65.05 |
| 7,066,519 B2 * | 6/2006 | Rhodes et al. | ................. | 296/66 |
| 7,077,451 B2 * | 7/2006 | Rhodes et al. | ........... | 296/65.01 |
| 2006/0097538 A1 | 5/2006 | Villeminey | | |

FOREIGN PATENT DOCUMENTS

| | | |
|---|---|---|
| EP | 0 900 689 | 12/2001 |
| EP | 0 899 152 | 7/2002 |
| EP | 0 943 486 | 12/2003 |
| EP | 0 985 575 | 6/2004 |
| EP | 0 943 482 | 1/2005 |

OTHER PUBLICATIONS

Picture of Opel Signum Seats.
International Search Report for PCT/US05/38643 dated Nov. 20, 2006, corresponding to U.S. Appl. No. 11/253,142 filed Oct. 18, 2005.

* cited by examiner

*Primary Examiner*—Kiran B. Patel
(74) *Attorney, Agent, or Firm*—Laura C. Hargitt

(57) ABSTRACT

An occupant seat is disclosed for a vehicle having a seat riser bracket and a floor with a footwell. The seat includes a seat bracket operatively connected to the vehicle floor and/or the seat riser bracket. A seat back is pivotally connected to the seat bracket, the seat back selectively rotatable between a seating configuration and a cargo configuration, the cargo configuration having the seat back substantially coplanar with the vehicle floor. A seat is cooperatively connected to the seat bracket and to the seat back, whereby when the seat back is rotated from the seating configuration to the cargo configuration, the seat is substantially simultaneously translated and rotated into a stowed configuration whereby the seat is at least partially within the footwell.

8 Claims, 2 Drawing Sheets

OCCUPANT SEAT SYSTEM

TECHNICAL FIELD

The present disclosure relates generally to occupant seat systems, and more particularly to such systems adapted to fold into cargo carrying configuration(s).

BACKGROUND

Many vehicles are designed for carrying passengers and cargo. Removable seats have been used to maximize the cargo carrying capacity of a vehicle that can also carry passengers. However, the removable seats tend to be relatively heavy and difficult to store. Folding seats have also been used to increase the cargo volume of a vehicle, or to allow larger cargo to be carried within the vehicle. The folding seat systems where the seatback is rotated forward and down to form a cargo floor may be relatively easy to use, but since the seat cushion remains in the passenger configuration, and the seat back lays substantially on top of the seat cushion, the cargo floor remains relatively high relative to the vehicle floor, thereby reducing the volume of the cargo that may be carried, and, in some instances, rendering the cargo floor relatively inconvenient to access. Other designs have been proposed to lower that cargo floor, but these invariably are relatively complex, require more operational steps to configure, and/or require the use of automation.

As such, it would be desirable to provide an occupant seat system that is configurable for carrying passengers or for carrying cargo, and that provides a relatively low cargo floor relative to the vehicle floor. It would further be desirable to provide such a system that may be configured with a relatively small number of simple operational steps.

SUMMARY

The present disclosure substantially solves the drawbacks enumerated above by providing an occupant seat for a vehicle having a seat riser bracket and a floor with at least one footwell. The seat includes a seat bracket operatively connected to at least one of the vehicle floor and the seat riser bracket. A seat back is pivotally connected to the seat bracket, the seat back selectively rotatable between a seating configuration and a cargo configuration, the cargo configuration having the seat back substantially coplanar with the vehicle floor. A seat is cooperatively connected to the seat bracket and to the seat back, whereby when the seat back is rotated from the seating configuration to the cargo configuration, the seat is substantially simultaneously translated and rotated into a stowed configuration whereby the seat is at least partially within the footwell.

BRIEF DESCRIPTION OF THE DRAWINGS

Objects, features and advantages of embodiments of the present disclosure may become apparent by reference to the following detailed description and drawings, in which like reference numerals correspond to similar, though not necessarily identical components. For the sake of brevity, reference numerals having a previously described function may not necessarily be described in connection with other drawings in which they appear.

DETAILED DESCRIPTION OF THE EMBODIMENTS

It has been unexpectedly and fortuitously discovered that a passenger seat system for a vehicle can be designed to quickly and easily fold into a stowed configuration (with a minimum amount of stowing effort and steps required on the part of the user), thereby providing a floor plane substantially lower than those of known folding seat systems. This may be particularly desirable in the case of SUVs and/or other large vehicles which may be relatively high off the ground, rendering it difficult in some instances to use a cargo area formed by folded passenger seats. It may also be desirable for any vehicle where it is desired to increase its cargo carrying capacity. It has also been fortuitously discovered that such a system may be made of modular components which may advantageously be used for a variety of vehicle platforms with substantially no modifications, or minor modifications thereto.

Figure 1:
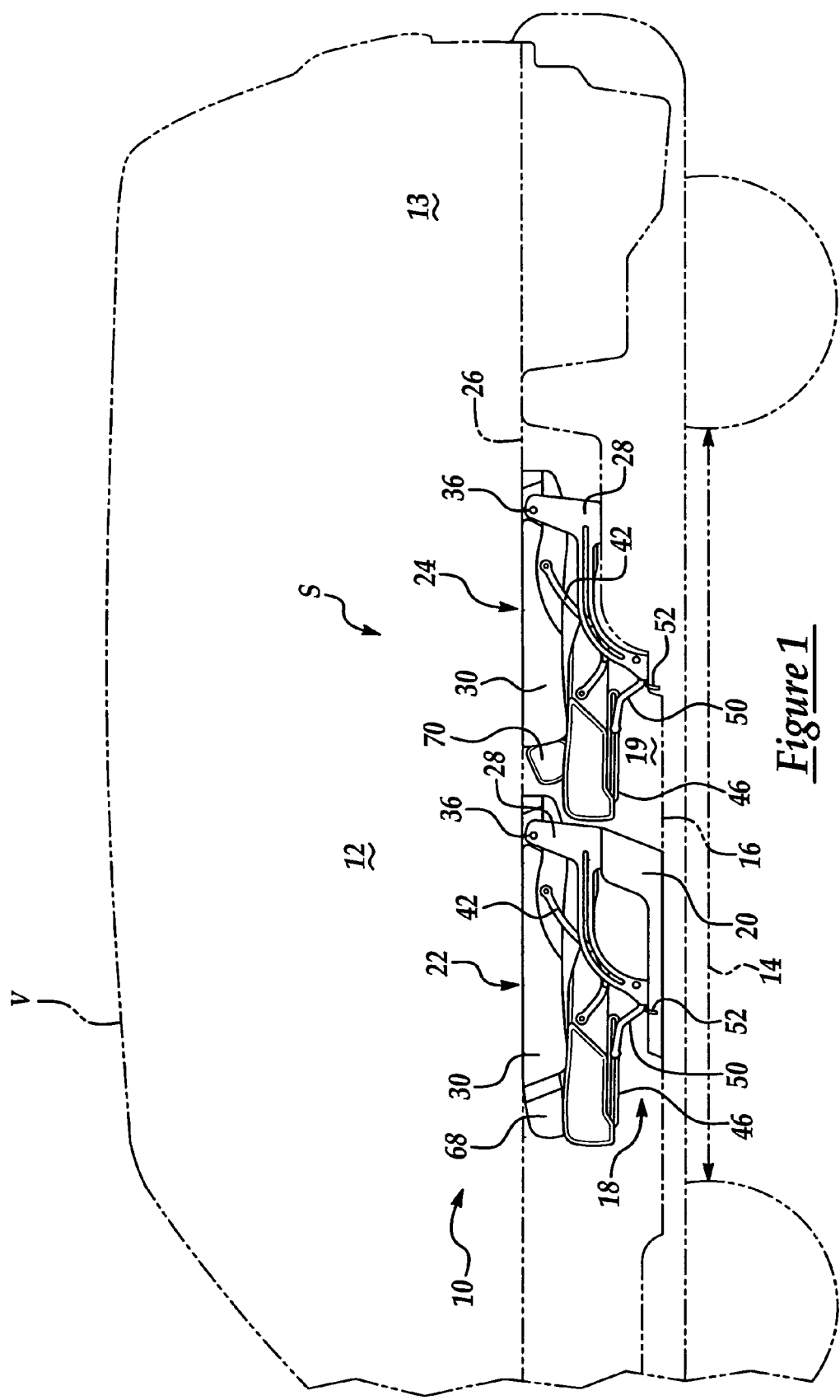
FIG. 1 is a semi-schematic side view of the occupant seat system, showing a forward seat module and a rearward seat module, with the seat system in the stowed configuration.

Referring now to FIG. 1, an occupant seat system according to the present disclosure is designated generally as 10. Seat system 10 is for use with a vehicle V (shown in phantom) having a passenger compartment 12, a wheelbase 14, a floor/floorpan 16 with at least one footwell 18, 19 (and optionally another footwell 19, 18), and at least one seat riser bracket 20 operatively connected to the vehicle floor/floorpan 16.

Figure 2:
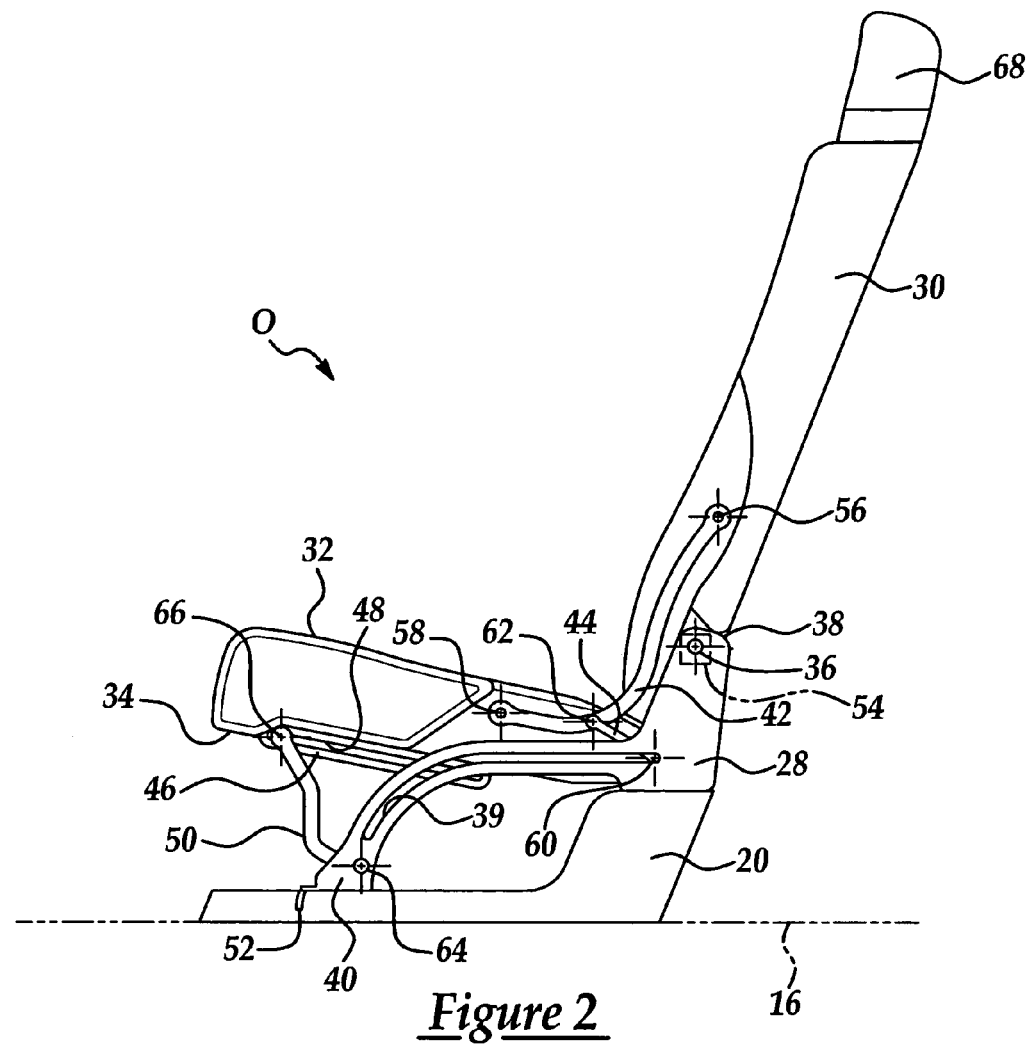
FIG. 2 is a semi-schematic side view of a seat module, shown in the seating configuration.
Figure 3:
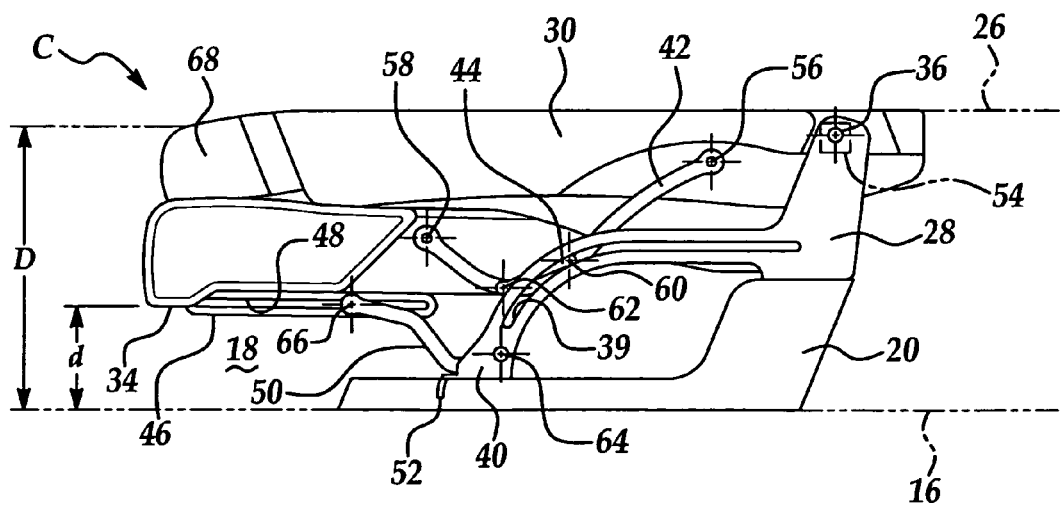
FIG. 3 is a semi-schematic side view of the seat module of FIG. 2, but shown in the cargo configuration.

Referring also to FIGS. 2 and 3, seat system 10 includes a seat bracket 28 operatively connected to the vehicle floor 16 and/or to the seat riser bracket 20. The seat riser bracket 20 may be operatively connected to the floorpan 16 so as to allow fore and aft adjustment of the seat module 22. A seat back 30 is pivotally connected to the seat bracket 28, the seat back 30 being selectively rotatable between a seating configuration O (FIG. 2) and a cargo configuration C (FIG. 3), the cargo configuration C having the seat back 30 substantially coplanar with the vehicle floor 16. A seat 32 is cooperatively connected to the seat bracket 28 and to the seat back 30, whereby when the seat back 30 is rotated from the seating configuration O to the cargo configuration C, the seat 30 is substantially simultaneously translated and rotated (described further hereinbelow) into a stowed configuration whereby the seat 32 is at least partially within the footwell 18, 19. It is to be understood that the driver's seat 30 generally does not move to a cargo configuration C.

FIG. 1 depicts a forward seat module 22 and a rearward seat module 24, with the forward 22 and rearward 24 seat modules forming a floor plane 26 in the passenger compartment 12 substantially parallel to the wheelbase 14 when the seat system 10 is in the stowed configuration S.

In an embodiment, seat 32 has an underside 34, and the seat back 30 is pivotally connected to the seat bracket 28 at a seat hinge point 36. Hinge point 36 is generally located at one end 38 of seat bracket 28. The seat bracket 28 further has an end region 40 distal to the one end 38, and a substantially curved slot 39 located below the hinge point.

The seat system 10, in one example embodiment, may further include a lumbar link 42 pivotally connected at one end 56 to the seat back 30 above the seat hinge point 36 and pivotally connected at an opposed end 58 to the seat 32. A connecting link 44 is slidingly connected at one end 60 to the curved slot 39 and pivotally connected at an opposed end 62 to the lumbar link 42. Curved slot 39 generally provides a constraint for the motion of one end 60 of connecting link 44.

A seat underside bracket 46 is connected to the seat underside 34, and has a slot 48 extending a predetermined length therewithin. A cushion link 50 is pivotally connected at one end 64 to the seat bracket 28 between the curved slot 39 and the seat bracket end region 40, and is slidingly connected at an opposed end 66 to the seat underside bracket slot 48.

A stop member 52 is optionally disposed on the vehicle floor 16 and/or on the seat riser bracket 20. The stop member 52 is adapted to abut the cushion link 50 when the seat 32 is in the stowed configuration S, C (as shown in FIGS. 1 and 3). Stop member 52 may aid in preventing and/or slowing undesirable wear of seat riser bracket 20 and/or floor 16.

In an embodiment, seat system 10 may include one or more forward seat module(s) 22 and/or one or more rearward seat module(s) 24 (a forward 22 and rearward 24 module are shown in FIG. 1). It is to be understood that either of the modules 22, 24 may be a bench seat. In an embodiment, the rearward seat module 24 is a bench seat. In yet a further embodiment, there are two or more rearward seat modules 24. It is further contemplated as being within the purview of the present disclosure that the vehicle V may have a forward seat module 22 or one or more rearward seat modules 24 (i.e. the vehicle V does not need to have both a forward 22 and rearward 24 seat module). Some modules 22, 24 may be bench seats, some not, etc. As may be seen, there are a large variety of possible permutations for incorporating seat modules 22 and/or 24 into vehicle V.

In an embodiment, the system 10 may further include a latch mechanism 54 (shown schematically and in phantom in FIGS. 2 and 3), operatively attached to the seat system 10/seat module 22, 24, for selectively and releasably locking the seat back 30 into the seating configuration O and/or the cargo configuration C. It is to be understood that latch mechanism 54 may be any latch mechanism suitable for use in embodiment(s) of the present seating system 10. Still further, it is to be understood that latch mechanism 54 may be a power actuated latch mechanism, or a manually actuated latch mechanism. Yet still further, a single latch mechanism 54 may be used to both releasably lock seat back 30 into the seating configuration O and releasably lock seat back 30 into the cargo configuration C. In an alternate embodiment, two or more latch mechanisms 54 may be used to accomplish these functions. Still further, latch mechanism 54 may itself include two or more latch mechanisms.

It is to be understood that headrest 68 and 70 on forward 22 and rearward 24 seat modules, respectively, may desirably fold out of the way, thereby remaining substantially even with, or below cargo floor plane 26. In an embodiment, headrest 70 may be movable between a first, extended position and a second, retracted position, as well as any suitable number of intermediate positions therebetween; in this embodiment, the headrest 70 generally does not tilt forward or backward (relative to the seat back 30 in the seating configuration O).

One of the many advantages of the embodiment(s) of the present disclosure is that, since the seat 32 moves into one of the footwells 18, 19 when seat module 22, 24/system 10 is in the cargo C/stowed S configuration, the seat underside 34 is spaced from the floorpan 16 a distance d substantially lower than that distance in known vehicle folding seats systems. It is to be understood that the distance d depends in part upon the height of the floorpan 16 for the particular vehicle. Some non-limitative examples of distance d are recited here. In an embodiment, distance d may range between about 8 cm and about 15 cm; and in a further embodiment, between about 9 cm and about 11 cm.

Further, since distance d is relatively low, a distance D from the vehicle floor 16 to floor plane 26 is generally lower than that distance in known vehicle folding seats systems. In an embodiment, distance D ranges from about 28 cm to about 35 cm; and in a further embodiment, from about 30 cm to about 33 cm. In known folding seats systems, distance D may range from about 40 cm to about 50 cm. The relatively low distance D may especially be advantageous in SUVs and other vehicles where the cargo area may be relatively inconvenient to reach and/or in any vehicle in which it is desired to increase the cargo carrying capacity.

It is to be understood that the size, shape, positioning etc. of the links, brackets and/or the like described in relation to the kinematics of embodiment(s) of the present disclosure may be varied as desired to render a floor plane 26 having a predetermined/desired distance D according to embodiment(s) of the present disclosure.

Further, the surface forming the floor plane 26 may advantageously be substantially flat (i.e., substantially no step areas nor ramp areas in floor plane 26). This embodiment of the floor plane 26 may be advantageous in that a user would not have to lift cargo and/or himself/herself up a ramp/step area between the cargo area 13 and the passenger compartment 12.

Another advantage of the present disclosure is that the seat system 10/seat modules 22, 24 are modular in nature, i.e., adapted for use in at least one other vehicle of a different model than vehicle V with little or substantially no modification.

It is to be understood that, if desired, the system 10 of the present disclosure may be automated or semi-automated, though this is not necessary.

It is to be further understood that the various links described herein may be operatively connected to/within the various components with any suitable connecting members, including but not limited to pins (one example of which is a clevis pin), rivets, bolts (one example of which is a shoulder bolt), and the like, and/or any combinations thereof. Further, the connecting member may optionally include surface improvements or components such as hardened steel bearing surfaces, nylon or other polymeric bearing surfaces, washers, spacers, sliders, roller bearings, journal bearings, and the like, and/or any combinations thereof.

Further, it is to be understood that the seat system 10 of the present disclosure is contemplated to include seats that face forward, rearward or sideways, relative to forward motion of the vehicle V. It is to be further understood that the terms, "forward," "down," "up," and "rearward," when used herein to explain kinematic relationships, are intended to be relative to the rotating motion of the seat back 30 toward or away from seat 32, and into or out of footwell(s) 18, 19, and are not meant to be relative to the orientation of the seat in the vehicle V (though in some instances the terms may coincide with the orientation of the seat in the vehicle V).

It is contemplated as being within the purview of the present embodiment(s) that the seat riser bracket 20, though not shown, may also be used with a rearward seat module 24, if desired. Further, seat riser bracket 20 may be adapted to, and/or connected to a mechanism to render the seat module(s) 22, 24 adjustable (back and forth, up and down, etc.). It is also to be understood that the rearward seat module 24 may be removable, if desired.

A method of selectively forming at least one cargo carrying area having a floor plane 26 in the vehicle V includes rotating the seat back 30 forward and down toward the seat 32, the rotating substantially simultaneously causing seat 32, cooperatively connected to the seat back 30 and to the seat bracket 28, to move forward and down (as stated above) at least partially into the footwell 18, 19 into the stowed configuration S, C, thereby forming the at least one cargo carrying area having floor plane 26.

The method may further include, prior to rotating the seat back 30, releasing the seat back 30 from a seating configuration locked position by unlatching latch mechanism 54. Further, the method may include releasably locking the seat back 30 into the stowed configuration C, S by latching latch mechanism 54 and/or a separate latch mechanism (as discussed above).

When the user wishes to return the seat module(s) 22, 24 to the seating configuration O, the method includes rotating the seat back 30 of a seat module up and rearward, relative to the seat 32, the rotating substantially simultaneously causing the seat 32 to move up and rearward out of the footwell(s) 18, 19, and into the seating configuration O.

The method as disclosed herein is advantageous in that it is relatively simple to fold/unfold the seat system 10 into/out of the cargo configuration C, S. The novel link system as described herein allows for substantially simultaneous desired movement of the seat 32 in response to the user's manipulation of seat back 30.

The system 10 of the present disclosure has many advantages, including but not limited to the following. The seat system 10 is adapted to selectively, quickly and easily fold into a stowed configuration S, C (with a minimum amount of stowing effort and steps required on the part of the user), thereby providing a floor plane 26 substantially lower than those of known folding seat systems. System 10 may also advantageously be formed from modular components which may advantageously be used for a variety of vehicle V platforms with little or substantially no modifications thereto. Further, many (up to about 70% or more) of the components of forward seat module 22 may be used in rearward seat module 24, and vice versa. This advantageously may reduce the cost and inventory space needed for modules 22, 24.

While several embodiments have been described in detail, it will be apparent to those skilled in the art that the disclosed embodiments may be modified. Therefore, the foregoing description is to be considered exemplary rather than limiting.

The invention claimed is:

1. An occupant seat system for a vehicle having a seat riser bracket and a floor with at least one footwell, the seat system comprising:
    a seat bracket operatively connected to at least one of the vehicle floor and the seat riser bracket;
    a seat back pivotally connected to the seat bracket, the seat back selectively rotatable between a seating configuration and a cargo configuration, the cargo configuration having the seat back substantially coplanar with the vehicle floor;
    a seat cooperatively connected to the seat bracket and to the seat back, whereby when the seat back is rotated from the seating configuration to the cargo configuration, the seat is substantially simultaneously translated and rotated into a stowed configuration whereby the seat is at least partially within the at least one footwell;
    the seat has an underside and wherein the seat back is pivotally connected to the seat bracket at a seat hinge point at one end thereof, the seat bracket having an end region distal to the one end and a substantially curved slot located below the hinge point, the seat system further comprising:
    a lumbar link pivotally connected at one end to the seat back above the seat hinge point and pivotally connected at an opposed end to the seat;
    a connecting link slidingly connected to the curved slot and pivotally connected to the lumbar link;
    a seat underside bracket connected to the seat underside, the seat underside bracket having a slot extending a predetermined length therewithin; and
    a cushion link pivotally connected to the seat bracket between the curved slot and the seat bracket end region, and slidingly connected to the seat underside bracket slot.

2. The seat system as defined in claim 1, further comprising a latch mechanism, operatively attached to the seat system, for selectively locking the seat back into at least one of the seating configuration and the cargo configuration.

3. The seat system as defined in claim 1, wherein the seat has an underside, and wherein the seat underside is spaced from the floorpan a distance ranging from about 8 cm to about 10 cm.

4. The seat system as defined in claim 1, further comprising a stop member disposed on at least one of the vehicle floor and the seat riser bracket, the stop member adapted to abut the cushion link when the seat is in the stowed configuration.

5. The seat system as defined in claim 1 wherein the seat system comprises at least one of a forward seat module and a rearward seat module.

6. The seat system as defined in claim 1 wherein the rearward seat module is a bench seat.

7. The seat system as defined in claim 1, further comprising at least a second rearward seat module.

8. The seat system as defined in claim 1 wherein the seat system is adapted for use in at least an other vehicle, the other vehicle being a model different from the vehicle.

* * * * *